(12) United States Patent
Morita et al.

(10) Patent No.: US 6,570,355 B2
(45) Date of Patent: May 27, 2003

(54) CONTROL APPARATUS FOR ROBOT

(75) Inventors: Kunitoshi Morita, Amagasaki (JP); Kei Aimi, Hirakata (JP); Masahiro Ohto, Hirakata (JP); Kazunori Matsumoto, Ibaraki (JP); Takashi Nakatsuka, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/822,483

(22) Filed: Apr. 2, 2001

(65) Prior Publication Data

US 2001/0027352 A1 Oct. 4, 2001

(30) Foreign Application Priority Data

Apr. 3, 2000 (JP) ........................................ 2000-101048

(51) Int. Cl.$^7$ ............................................... B25J 19/06
(52) U.S. Cl. ................................. 318/563; 318/568.16
(58) Field of Search ............................ 318/563, 565, 318/568.11, 568.16; 307/112, 113, 116; 901/50

(56) References Cited

U.S. PATENT DOCUMENTS 5,212,433 A * 5/1993 Yasuyuki ............... 318/568.13
5,841,257 A * 11/1998 Hashimoto et al. ..... 318/568.11
RE36,631 E * 3/2000 Tanabe et al. ......... 318/568.13
6,051,894 A * 4/2000 Shimogama ................ 307/125

* cited by examiner

*Primary Examiner*—Bentsu Ro
(74) *Attorney, Agent, or Firm*—Stevens, Davis, Miller & Mosher, LLP

(57) ABSTRACT

An object of the present invention is to provide a control apparatus for a robot in which the work efficiency is improved in the whole robot peripheral system including the robot, and in which considering the increase in the consciousness of safety such as the standardization of safety apparatuses, both the reliability of the safety circuit of the control apparatus for a robot and the ensuring of the safety are improved.

By connecting, to peripheral devices outside the robot, each intermediate output signal line for extracting the operation signal or the emergency stop signal of each of the plurality of switches each assigned to a factor causing the stop of the robot, a factor to cause the stop of the robot body alone can be distinguished from a factor to cause the stop of both the robot body and the peripheral devices.

15 Claims, 8 Drawing Sheets

CONTROL APPARATUS FOR ROBOT

BACKGROUND OF THE INVENTION

1. Field of the Invention

The present invention relates to a control apparatus for a robot, and in particular in an industrial robot, to a method of outputting a stop signal for the periphery of the robot and to the configuration of a safety circuit for generating the stop signal when the robot is stopped in case of abnormality in the periphery of the robot.

2. Description of the Related Art

An industrial robot is provided with emergency stop switches in order to secure the safety of both the operator of the robot and the workers in the periphery of the robot. Since these emergency stop switches are electrically connected to a safety circuit in series, the operation of any emergency stop switch causes the switching OFF of a servo power supply for driving a motor in the robot body.

These emergency stop switches indicate those switches for detecting the occurrence of a factor harmful to the safety, and include: an emergency stop switch provided in the body of the control apparatus; a door open-close switch provided in a safety fence for insuring a safety region in the periphery of the robot; an external emergency stop switch in a peripheral system; and an over travel switch for the robot body. Each switch is configured in linkage with the driving circuit of the servo power supply so as to control the switching ON permission and the switching OFF of the servo power supply. A prior art safety apparatus for an industrial robot is described below with reference to FIG. 8.

In a safety circuit of a robot body 1 shown in FIG. 8, disposed in series are switches 21 to 2n each corresponding to a factor inhibiting the switching ON of a servo power supply 4 to the robot body 1. One end of the switch 21 is supplied with a 24 V voltage, while the last end of the switch 2n is provided with a relay 3 for controlling the switching ON and switching OFF of the servo power supply, whereby a first signal line is formed. Further, a signal of servo switching ON permission is provided from a control apparatus 5 to the servo power supply 4. Without a factor inhibiting the switching ON of the servo power supply to the robot body 1, each switch 21 to 2n is closed thereby to provide the 24 V voltage on the first signal line. A relay coil 31 is then excited thereby to close a relay contact 32. Then, finally, a servo power supply switching ON circuit in the servo power supply 4 is driven. When switched ON, the servo power supply starts to energize (control) a motor 11 included in the robot body 1, while a lock (brake 12) circuit of a shaft of the motor 11 is switched OFF.

In this state, when at least one of the switches 21 to 2n is operated (to become open) due to occurrence of a factor inhibiting the switching ON of the servo power supply, the first signal line is switched OFF, and the 24 V voltage is not supplied. At that time, by monitoring the potential in the end point on the relay 3 side of each switch with a control apparatus 5, it is known which switch is open. Further, the relay coil 31 becomes unexcited thereby to open the relay contact 32. The servo power supply is then switched OFF thereby to stop to energize (control) the motor 11 in the robot body 1, while the brake 12 of the shaft of the motor 11 is switched ON.

As such, as is described in Japanese Laid-Open Patent Publication No. Hei 10-217180, when any of the switches 21 to 2n becomes open, the first signal line which is the servo power supply switching ON permission line is switched OFF, whereby the servo power supply is switched OFF thereby to cause immediate stop of the robot.

In the prior art safety apparatus for an industrial robot as described above, a signal for sending the emergency stop to external devices is output by the open-close of the relay contact 32. Further, in a production line in which each of a plurality of robots is disposed in each work area, the emergency stop of each work area is monitored using the above-mentioned signal. Accordingly, even when a trouble occurs only in some of the work areas, the robots in all of the areas are immediately stopped. Therefore, even when a work area is to be stopped to ensure the safety in the work area in case of a trouble (such as a change of expendable parts) which concerns the work area alone and does not affect the other work areas, the whole line is stopped in accordance with the prior art configuration. This causes the problem of reducing the work efficiency.

Further, since the switching OFF of the servo power supply for the industrial robot is carried out by breaking the switch contact of a limit switch and the like of each switch 21 to 2n, in case of occurrence of a contact fusion in any switch, the servo power supply is not properly switched OFF even in case of occurrence of the emergency stop factor corresponding to the switch. Furthermore, the control apparatus 5 can not detect the occurrence position of the fusion, and hence the reliability of the safety circuit of the control apparatus 5 is not secured.

An object of the present invention is to provide a control apparatus for a robot in which the work efficiency is improved in the whole robot peripheral system including the robot, and in which considering the increase in the consciousness of safety such as the standardization of safety apparatuses, both the reliability of the safety circuit of the control apparatus for a robot and the ensuring of the safety are improved.

SUMMARY OF THE INVENTION

A control apparatus for a robot in accordance with the present invention comprises a switch circuit consisting of a plurality of emergency stop switches interconnected in series, wherein a servo power supply is switched ON or OFF by the switch circuit, and wherein each of the plurality of switches is provided with an intermediate output signal line for extracting the operation signal, or the emergency stop signal thereof.

In accordance with the control apparatus for a robot in accordance with the present invention, by connecting the intermediate output signal lines to peripheral devices outside the robot, a factor to cause the stop of the robot body alone can be distinguished from a factor to cause the stop of both the robot body and the peripheral devices. This permits the safety circuit of the whole robot system to be configured with flexibility, and accordingly the work efficiency can be improved without degrading the safety.

A control apparatus for a robot in accordance with the present invention comprises a switch circuit consisting of a plurality of emergency stop switches interconnected in series, wherein a servo power supply is switched ON or OFF by the switch circuit, wherein each of the plurality of switches comprises a first open-close contact and a second open-close contact both operating simultaneously, wherein every first open-close contact of each of the plurality of the switches is interconnected in series by a first signal line, while every second open-close contact of each of the plurality of the switches is interconnected in series by a second signal line, and wherein an intermediate output signal line for extracting the operation signal or the emergency stop signal of each of the plurality of switches is connected to at least one of the first signal line and the second signal line.

In accordance with the control apparatus for a robot in accordance with the present invention, a case to stop the whole system including the robot body, a case to cause the stop of the robot body and a part of peripheral devices, and a case to cause the stop of the robot body alone can be distinguished with each other. This permits the safety circuit of the whole robot system to be configured with flexibility, and accordingly the work efficiency can be improved without degrading the safety.

A control apparatus for a robot in accordance with the present invention comprises a switch circuit consisting of a plurality of emergency stop switches interconnected in series, wherein a servo power supply is switched ON or OFF by the switch circuit, wherein each of the plurality of switches comprises a first open-close contact and a second open-close contact both operating simultaneously, wherein every first open-close contact of each of the plurality of the switches is interconnected in series by a first signal line, while every second open-close contact of each of the plurality of the switches is interconnected in series by a second signal line, wherein each of the first signal line and the second signal line is provided with a voltage of an opposite polarity with each other relatively to the plurality of switches, and wherein a relay for extracting the operation signal or the emergency stop signal of the plurality of switches is connected to the end on the same side of each of the first signal line and the second signal line.

In accordance with the control apparatus for a robot in accordance with the present invention, in case of occurrence of a short circuit between the first signal line and the second signal line for controlling the switching ON and OFF of the servo power supply for driving the motor, the servo power supply can be immediately switched OFF. This improves the safety of the control apparatus for a robot.

A control apparatus for a robot in accordance with the above-mentioned present invention further comprises current interrupting means disposed in the end opposite to the relays in the first signal line and the second signal line and for interrupting a current greater than or equal to a predetermined value.

In accordance with the control apparatus for a robot in accordance with the present invention, in case of occurrence of a short circuit between the first signal line and the second signal line, the servo power supply can be immediately switched OFF, while the occurrence of the short circuit can be detected by the control apparatus. As such, since the control apparatus can detect the occurrence of abnormality and the occurrence position of abnormality in the signal lines, the repair work of the control apparatus is speeded up.

In a control apparatus for a robot in accordance with the above-mentioned present invention, a fuse is used as the current interrupting means.

Further, in a control apparatus for a robot in accordance with the present invention, the plurality of switches are disposed in the order of priority.

In accordance with the control apparatus for a robot in accordance with the present invention, the disposing of the plurality of switches in the order of priority permits the optimal setting depending on the system to be used, for example, when a case to stop the whole system including the robot body, a case to cause the stop of the robot body and a part of peripheral devices, and a case to cause the stop of the robot body alone are to be distinguished with each other.

In a control apparatus for a robot in accordance with the above-mentioned present invention, an intermediate output signal line for extracting the operation signal or the emergency stop signal of each of the plurality of switches is connected to at least one of the first signal line and the second signal line.

In accordance with the control apparatus for a robot in accordance with the present invention, the disposing of the plurality of switches in the order of priority permits the optimal setting depending on the system to be used when a case to stop the whole system including the robot body, a case to cause the stop of the robot body and a part of peripheral devices, and a case to cause the stop of the robot body alone are to be distinguished with each other. Further, in case of occurrence of a short circuit between the first signal line and the second signal line, the servo power supply can be immediately switched OFF, while the occurrence of the short circuit can be detected by the control apparatus.

DESCRIPTION OF PREFERRED EMBODIMENTS

A first embodiment of the present invention is described below with reference to FIG. 1.

Figure 1:
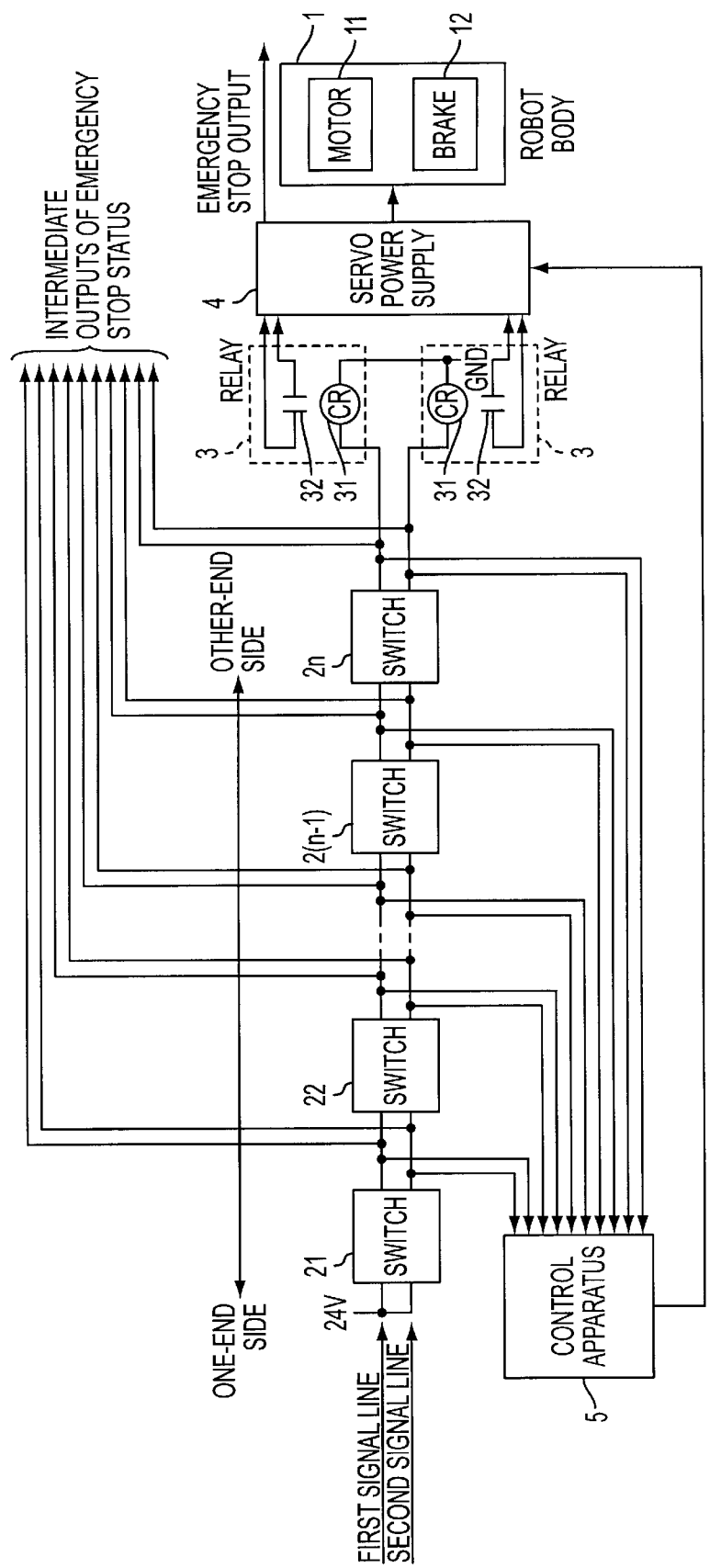
FIG. 1 is a block diagram showing a first embodiment of the present invention, and is used also for describing a fourth embodiment of the present invention.

FIG. 1 shows the configuration of a first embodiment of the present invention. In a safety circuit of a robot body 1, each of n switches 21 to 2n each assigned to a factor of emergency stop comprises a first open-close contact and a second open-close contact both operating simultaneously. The first open-close contacts are interconnected electrically in series by a first signal line for controlling the switching ON and OFF of a servo power supply 4, while the second open-close contacts are interconnected electrically in series by a second signal line for controlling the switching ON and OFF of the servo power supply 4. Each of one ends of the signal lines is supplied with a 24 V voltage, while each of the other ends is grounded through a relay 3. In a normal state without any factor inhibiting the switching ON of the servo power supply, all of the n switches 21 to 2n are closed, and hence the first and second signal lines are in the ON voltage state with 24 V.

Thus, the relay coil 31 of each relay 3 is excited thereby to close the relay contact 32. By connecting this open-close status of the relay contact 32 into a driving circuit for switching ON and OFF of the servo power supply in the servo power supply 4, the switching ON and OFF of the servo power supply can be controlled in hardware by switching ON and OFF the switches 21 to 2n, or alternatively in software by a signal such as servo power supply switching ON permission from the control apparatus 5.

When switched ON, the driving circuit of the servo power supply 4 starts to energize the motor 11 of the robot body 1, and switches OFF the lock (brake 12) circuit of the shaft of the motor 11.

Further, the potential of the end on the servo power supply 4 side of each of the n switches 21 to 2n is output to the control apparatus 5. Similarly, an intermediate output of emergency stop is output from each end to external devices. Since every switch is interconnected in series on each of the first and the second signal lines, when any switch is opened for emergency stop, the signal line is interrupted at the open switch thereby to cause a potential drop from 24 V to 0 V. Accordingly, the control apparatus 5 can detect which switch is open. Further, in the emergency stop signals being output to the external devices, no change in the potential is caused by any switch on the servo power supply 4 side (the other end side) of the selected intermediate output signal, whereas a change in the potential is caused by any switch disposed on the opposite side (one end side).

Accordingly, a factor of emergency stop can be selected for each peripheral device by selecting an intermediate output signal of emergency stop signal located on the 24 V side (one end side) of the switch corresponding to the factor in question and by connecting it to the peripheral device not to be stopped by the emergency stop of the robot body 1.

Further, since the first open-close contact and the second open-close contact both operating simultaneously are connected to the first signal line and the second signal line, respectively, even in case of occurrence of fusion in one of the contacts, the open-close contact suffering from the fusion can be detected by the control apparatus 5 by comparing the potential of one contact with the potential of the other contact of each switch 21 to 2n in the first and the second signal lines.

Figure 2:
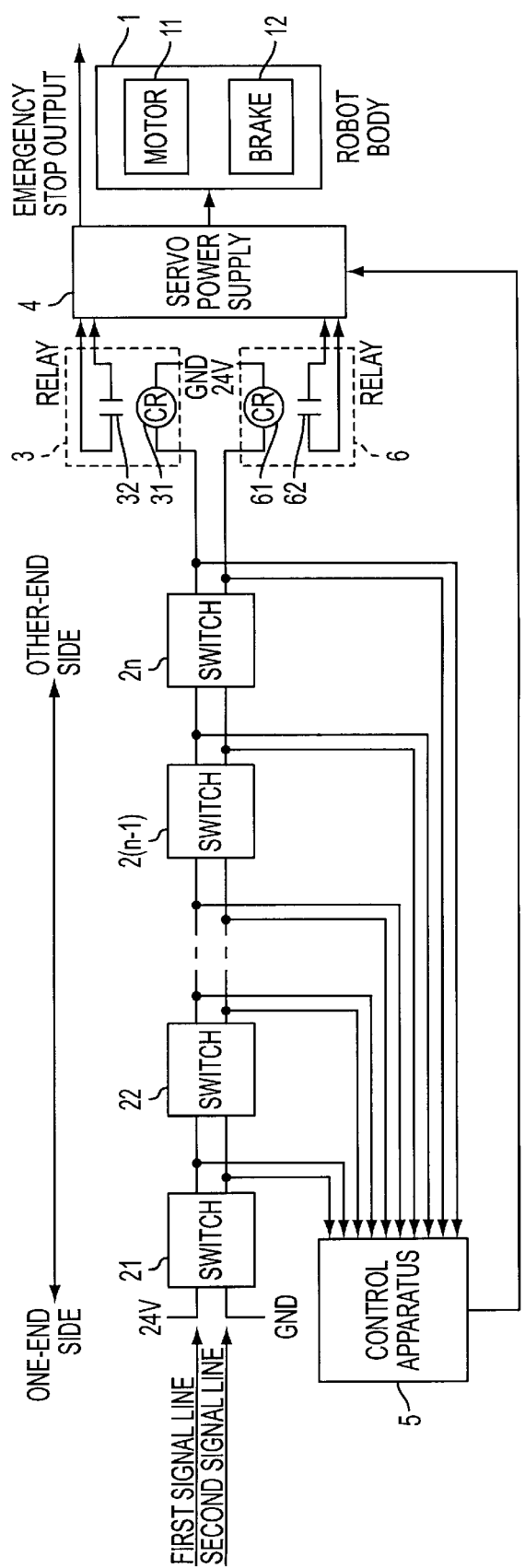
FIG. 2 is a block diagram showing a second embodiment of the present invention.
Figure 3:
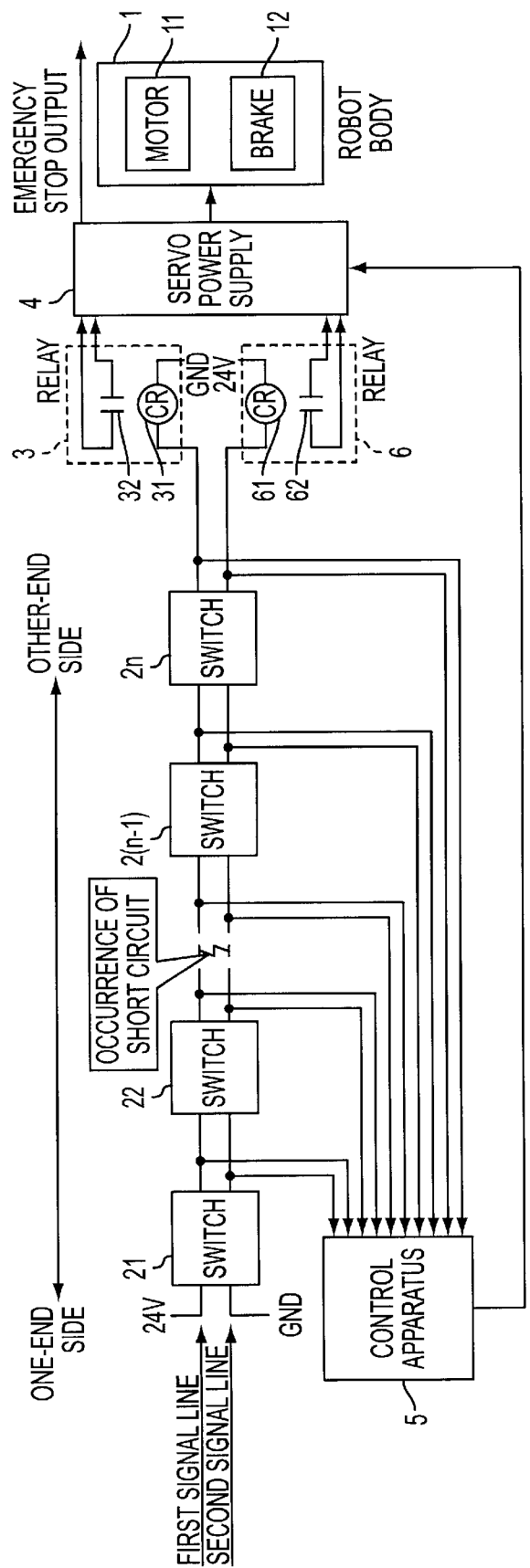
FIG. 3 is a block diagram describing the effect of a second configuration of the present invention.

A second embodiment of the present invention is described below with reference to FIGS. 2 and 3. FIG. 2 shows the second embodiment of the present invention. A like numeral designates a configuration, an action, and the like identical to that of the first embodiment, and the description is omitted.

In a safety circuit of a robot body 1, n switches 21 to 2n each assigned to a factor of emergency stop are interconnected electrically in series thereby to form a first signal line and a second signal line. One ends of the first signal lines is supplied with a 24 V voltage, while the other end is grounded through a relay 3. Further, one ends of the second signal lines is grounded, while the other end is supplied with a 24 V voltage. In a relay coil 61 of a relay 6, one end is supplied with a 24 V voltage, while the opposite end is connected to the second signal line. In a normal state without any factor inhibiting the switching ON of the servo power supply, all of the n switches 21 to 2n are closed, and hence the second signal line is in the ON voltage state with 24 V.

Thus, the relay coil 61 of the relay 6 connected to the second signal line is excited thereby to close the relay contact 62. This open-close status of the relay contact 62 is connected into a driving circuit for switching ON and OFF of the servo power supply in the servo power supply 4. As such, by supplying the 24 V voltage to the one end of the first signal line and by grounding the one end of the second signal line, an equivalent circuit of a signal line supplied with a 24 V voltage is formed from the one end of the first signal line to the one end of the second signal line. Accordingly, in case of occurrence of a short circuit between the first signal line and the second signal line as shown in FIG. 3, the voltage level of the second signal line is pulled up to 24 V at the position of occurrence. As a result, the relay coil 61 of the relay 6 becomes unexcited thereby to open the relay contact 62. The servo power supply is accordingly switched OFF by the relay 6. When the one end of the second signal line is not grounded but supplied with a 24 V voltage similarly to the first signal line, the short circuit does not cause the abovementioned switching OFF of the servo power supply. Further, in case of occurrence of a fusion in the contact of a switch 21, 22 on the one end side from the short circuit position of the signal line, all of the switches obviously do not work correctly.

Figure 4:
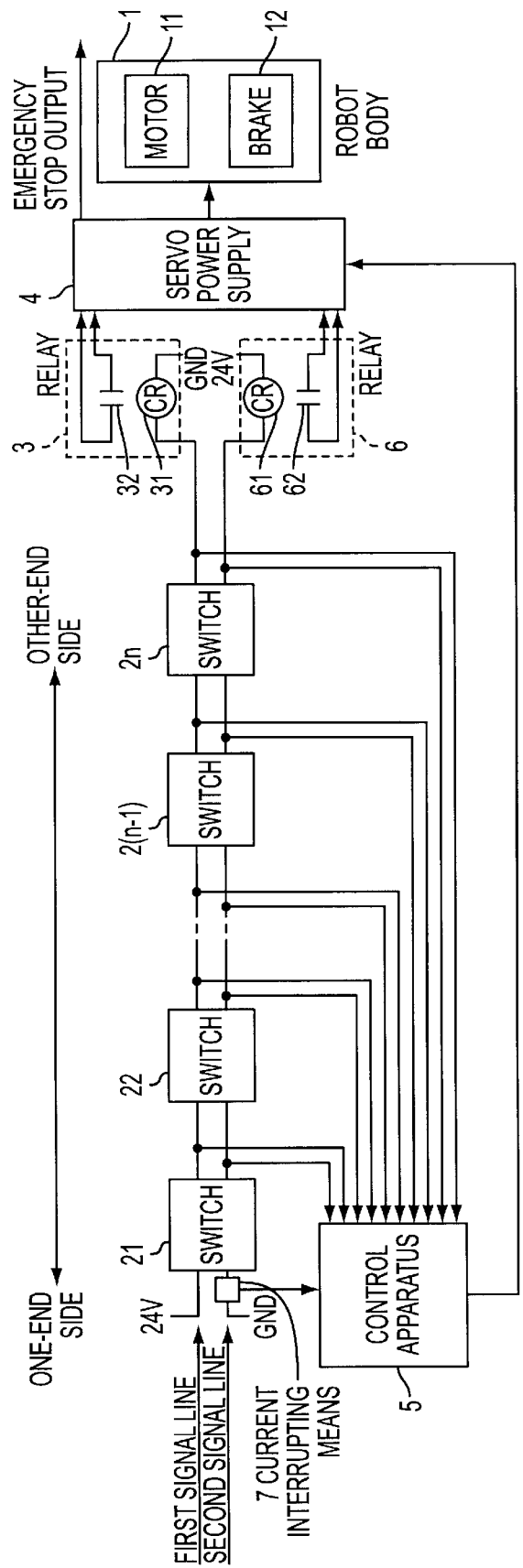
FIG. 4 is a block diagram showing a third embodiment of the present invention, and is used also for describing a fourth embodiment of the present invention.

A third embodiment of the present invention is described below with reference to FIGS. 4 to 6. FIG. 4 shows the third embodiment of the present invention. A like numeral designates a configuration, an action, and the like identical to that of the second embodiment, and the description is omitted.

Current interrupting means 7 for interrupting a current greater than or equal to a predetermined value is provided in the one end side of the second signal line.

Figure 5:
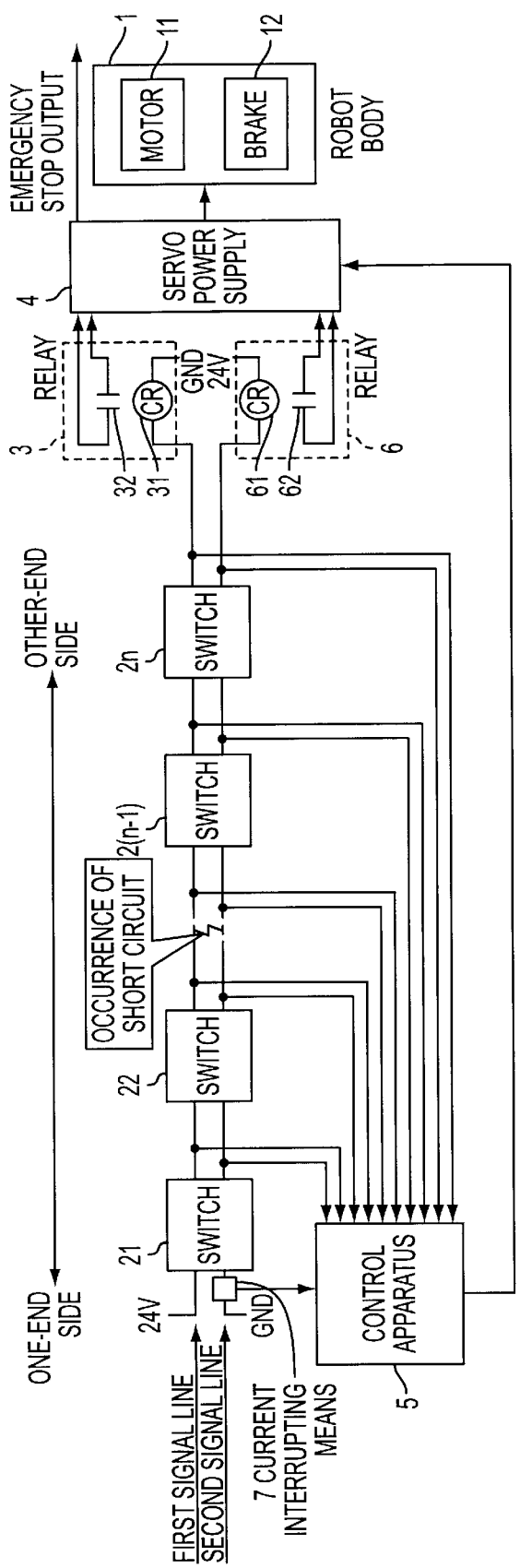
FIG. 5 is a block diagram used for describing the operation in the case of occurrence of a short circuit in a third embodiment of the present invention.

In case of occurrence of a short circuit between the first signal line and the second signal line, since the switches 21, 22 used are contact switches, the line formed by the switches 21, 22 via the short circuit point as shown in FIG. 5 has almost no load, and hence an extreme current flows. This over-current can be avoided using the current interrupting means 7. Further, by sending the status of the current interrupting means 7 to the control apparatus 5, the occurrence of a short circuit between the signal lines can be detected.

Figure 6:
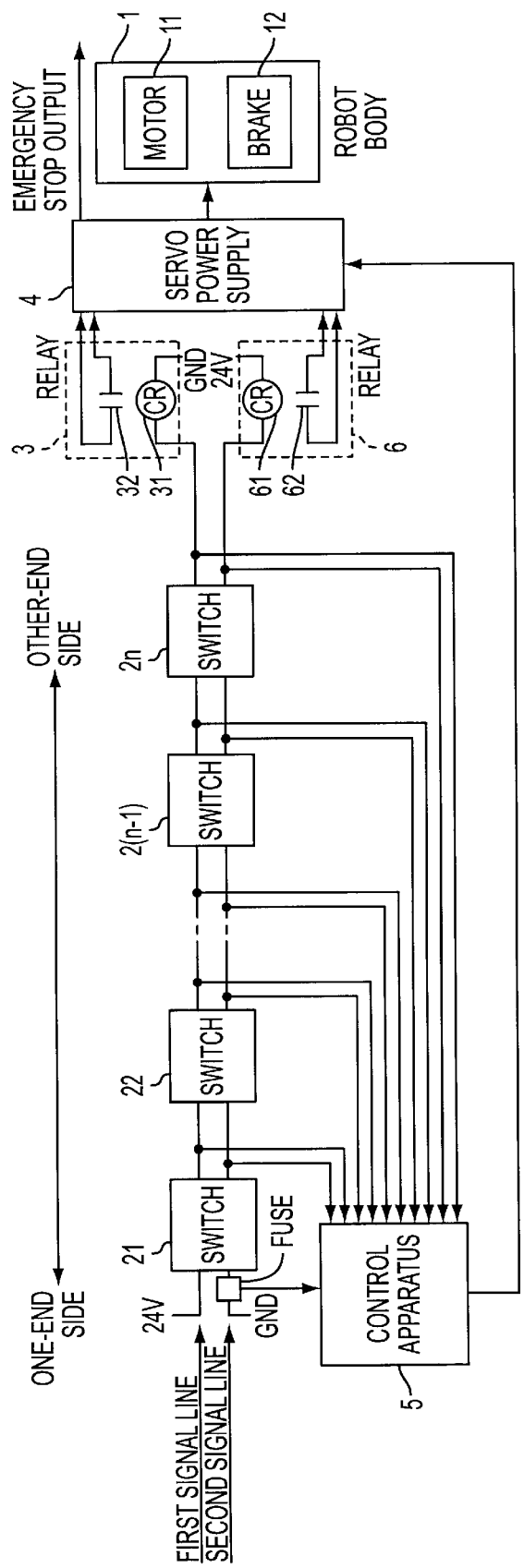
FIG. 6 is a block diagram showing a specific example of a third embodiment of the present invention.

The current interrupting means can obviously be implemented by using a fuse as shown in FIG. 6.

A fourth embodiment of the present invention is described below with reference to FIGS. 1 and 5. A like numeral designates a configuration, an action, and the like identical to that of the first embodiment, and the description is omitted.

In a safety circuit of a robot body 1 as shown in FIG. 1, n switches 21 to 2n each assigned to a factor of emergency stop are interconnected electrically in series thereby to form a first signal line and a second signal line. Each of one ends of signal lines is supplied with a 24 V voltage, while each of the other ends is grounded through a relay 3. In FIG. 5, in place of the second signal line, another second signal line is formed by grounding the one end and by supplying the 24 V voltage to the other end.

A priority is assigned to each factor of emergency stop to be assigned to each of then switches 21 to 2n, and then disposed in the order starting from the switch 21. As a result, the emergency stop signal by the switch assigned to the factor having the highest priority is output from all of the emergency stop intermediate outputs. Further, in the descending order of priority, each emergency stop intermediate output can be selected. Furthermore, the configuration of the signal lines as shown in FIG. 5 obviously improves the safety and the reliability of the safety circuit.

Figure 7:
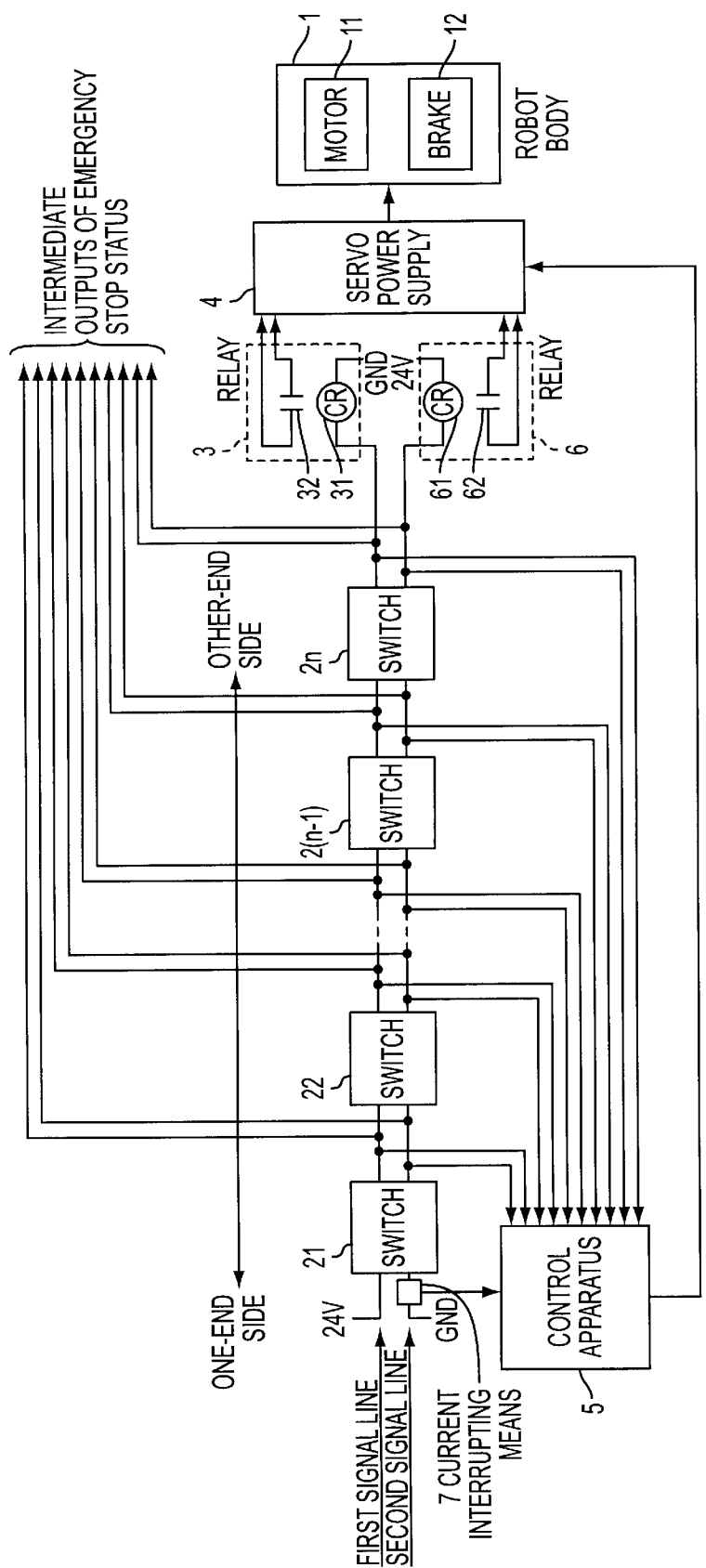
FIG. 7 is a block diagram showing a fifth embodiment of the present invention.
Figure 8:
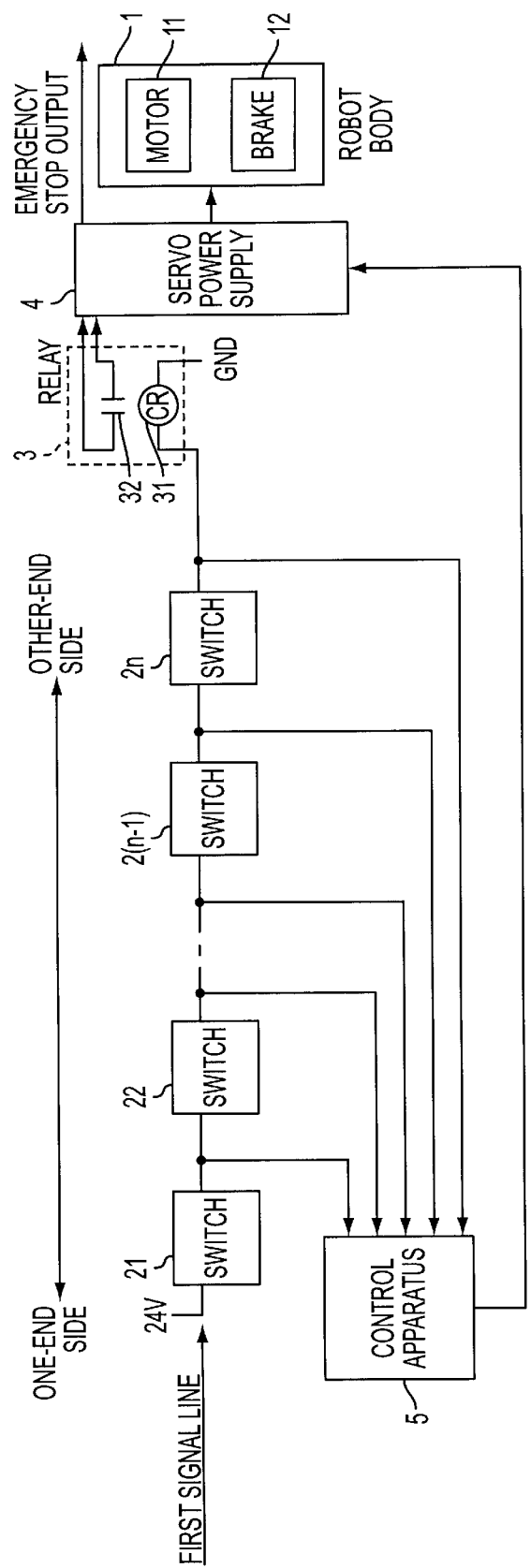
FIG. 8 is a block diagram showing a control apparatus for a robot in accordance with the prior art.

A fifth embodiment of the present invention is described below with reference to FIG. 7. FIG. 7 shows the fifth embodiment of the present invention. A like numeral designates a configuration, an action, and the like identical to that of the first, second, or third embodiment, and the description is omitted.

In the figure, in place of the second signal line shown in FIG. 1, another second signal line is formed by grounding the one end and by supplying the 24 V voltage to the other end. Further, current interrupting means 7 is provided in the one end of the second signal line. Furthermore, a priority is assigned to each of the n switches 21 to 2n corresponding to each factor of emergency stop in the descending order of priority starting from the switch 21. As a result, the emergency stop signal by the switch 21 is output from every intermediate output. In contrast, the emergency stop output by the switch having the lowest priority is output solely from the last end (most the other end side) intermediate output. Further, occurrence of a short circuit obviously causes immediate switching OFF of the servo power supply.

In the first embodiment, the first signal line and the second signal line have been provided, whereby intermediate output signal lines have been connected to each signal line. However, a single signal line may be provided, whereby an intermediate output signal line is connected to each switch.

Further, intermediate output signal lines shown in FIG. 1 have been omitted in the second to fourth embodiments. However, intermediate output signal lines may be connected between the one end and the other end of at least one of the first signal line and the second signal line.

What is claimed is:

1. A control apparatus for a robot, comprising a switch circuit including a plurality of emergency stop switches in series, said switch circuit for controlling switching ON and OFF of a servo power supply, wherein each of the plurality of switches comprises a first open-close contact and a second open-close contact both operating simultaneously, wherein each first open-close contact of each of the plurality of the switches is interconnected in series by a first signal line, while each second open-close contact of each of the plurality of the switches is interconnected in series by a second signal line, and wherein an intermediate output signal line for extracting the operation signal or the emergency stop signal of each of the plurality of switches is connected to at least one of the first signal line and the second signal line.

2. A control apparatus for a robot in accordance with claim 1, wherein the plurality of switches are disposed in the order of priority.

3. A control apparatus for a robot, comprising a switch circuit including a plurality of emergency stop switches in series, said switch circuit for controlling switching ON and OFF of a servo power supply, wherein each of the plurality of switches comprises a first open-close contact and a second open-close contact both operating simultaneously, wherein each first open-close contact of each of the plurality of the switches is interconnected in series by a first signal line, while each second open-close contact of each of the plurality of the switches is interconnected in series by a second signal line, wherein each of the first signal line and the second signal line is provided with an opposite voltage with each other relatively to the plurality of switches, and wherein a relay for extracting the operation signal or the emergency stop signal of the plurality of switches is provided in the end section of the same side of each the first signal line and the second signal line.

4. A control apparatus for a robot in accordance with claim 3, wherein current interrupting means for interrupting a current greater than or equal to a predetermined value is provided in the end section opposite to the relays in the first signal line and the second signal line.

5. A control apparatus for a robot in accordance with claim 4, wherein the current interrupting means is a fuse.

6. A control apparatus for a robot in accordance with claim 5, wherein the plurality of switches are disposed in the order of priority.

7. A control apparatus for a robot in accordance with claim 6, wherein an intermediate output signal line for extracting the operation signal or the emergency stop signal of each of the plurality of switches is provided in at least one of the first signal line and the second signal line.

8. A control apparatus for a robot in accordance with claim 5, wherein an intermediate output signal line for extracting the operation signal or the emergency stop signal of each of the plurality of switches is provided in at least one of the first signal line and the second signal line.

9. A control apparatus for a robot in accordance with claim 4, wherein the plurality of switches are disposed in the order of priority.

10. A control apparatus for a robot in accordance with claim 9, wherein an intermediate output signal line for extracting the operation signal or the emergency stop signal of each of the plurality of switches is provided in at least one of the first signal line and the second signal line.

11. A control apparatus for a robot in accordance with claim 4, wherein an intermediate output signal line for extracting the operation signal or the emergency stop signal of each of the plurality of switches is provided in at least one of the first signal line and the second signal line.

12. A control apparatus for a robot in accordance with claim 3, wherein an intermediate output signal line for extracting the operation signal or the emergency stop signal of each of the plurality of switches is provided in at least one of the first signal line and the second signal line.

13. A control apparatus for a robot in accordance with claim 3, wherein the plurality of switches are disposed in the order of priority.

14. A control apparatus for a robot in accordance with claim 13, wherein an intermediate output signal line for extracting the operation signal or the emergency stop signal of each of the plurality of switches is provided in at least one of the first signal line and the second signal line.

15. A control apparatus for a robot, said control apparatus comprising a switch circuit including a plurality of emergency stop switches arranged in series in order of priority, said switch circuit for controlling switching ON and OFF of a servo power supply, wherein each of the plurality of switches is provided with a first signal line and a second signal line, and each of the plurality of switches is provided with an intermediate output signal line in at least one of the first signal line and the second signal line, for extracting an operation signal or an emergency stop signal thereof.

* * * * *